United States Patent [19]
Vandervoort et al.

[11] 4,152,949
[45] May 8, 1979

[54] EXTENDED RANGE TRANSMISSION

[76] Inventors: John R. Vandervoort, Richland; Alan R. Davis, Plainwell, both of Mich.

[21] Appl. No.: 788,479

[22] Filed: Apr. 18, 1977

[51] Int. Cl.² .............................................. F16H 3/08
[52] U.S. Cl. ........................................ 74/331; 74/359; 74/360; 74/375
[58] Field of Search ................. 74/360, 356, 357, 359, 74/360, 331

[56] References Cited
U.S. PATENT DOCUMENTS

| | | | |
|---|---|---|---|
| 3,105,395 | 10/1963 | Perkins | 74/331 X |
| 4,023,418 | 5/1977 | Zenker | 74/331 X |
| 4,033,197 | 7/1977 | Shikiya | 74/360 X |

*Primary Examiner*—Benjamin W. Wyche
*Assistant Examiner*—Frank H. McKenzie, Jr.

[57] ABSTRACT

A simple change gear transmission having an extended range and/or number of gear ratios and minimized center distance and/or axial countershaft portion length is provided. The transmission utilizes a single main shaft and at least one countershaft which is compounded.

15 Claims, 5 Drawing Figures

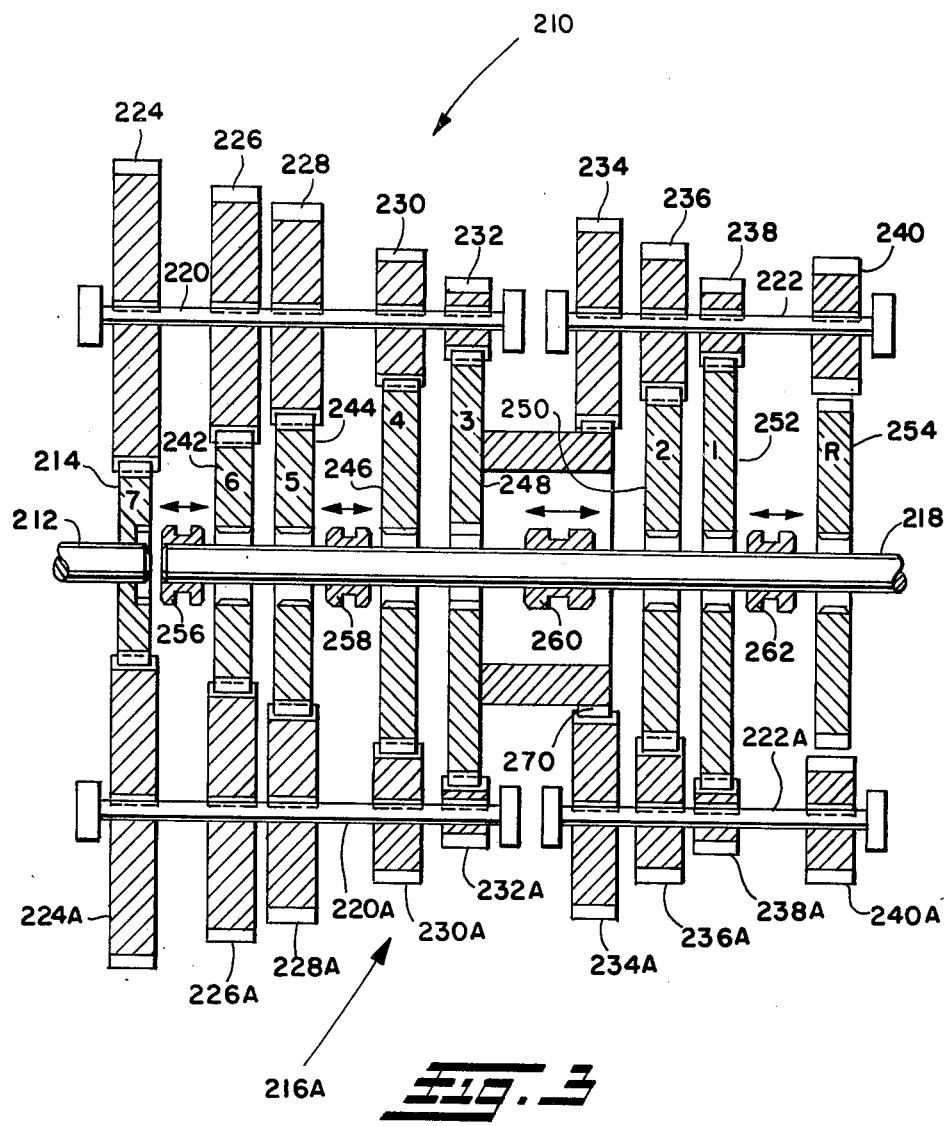

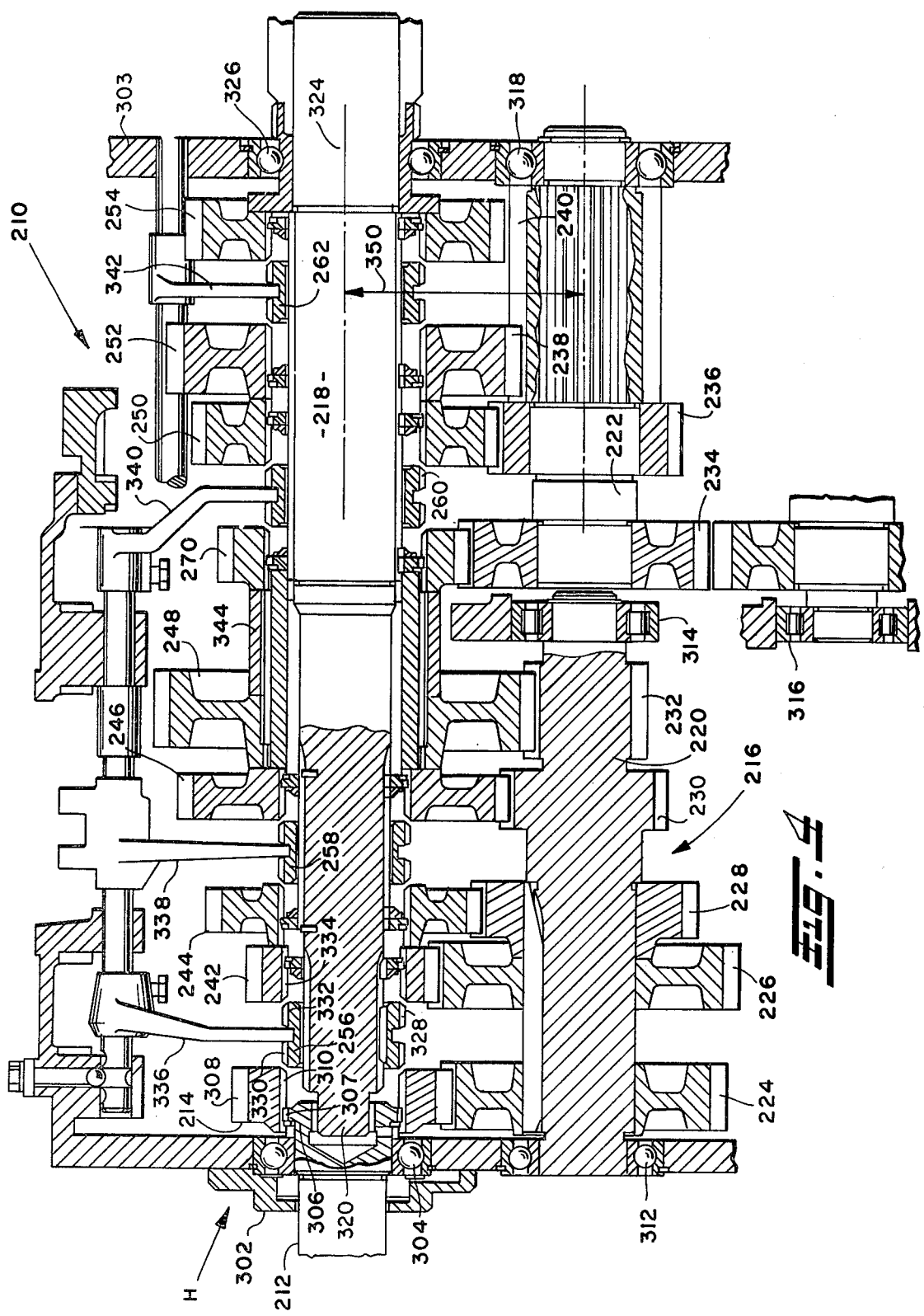

EXTENDED RANGE TRANSMISSION

BACKGROUND OF THE INVENTION

1. Field of the Invention

The present invention relates to simple transmissions utilizing compound countershafts and in particular relates to simple transmissions of the floating mainshaft, multiple countershaft type wherein the countershafts are compounded.

2. Description of the Prior Art

Simple transmissions, that is, transmissions utilizing a one piece mainshaft, are well known in the prior art. Transmissions utilizing either simple or compound mainshafts in connection with multiple countershafts wherein either the mainshaft gears or the countershaft gears are mounted in a radially floating manner relative to the other gears are well known in the prior art. Examples of such transmissions may be seen by reference to U.S. Pat. Nos. 3,105,395; 3,255,644; 3,283,613; 3,335,616; 3,349,635; 3,378,214; 3,500,695; and 3,648,546.

The prior art transmissions, particularly those transmissions utilizing a floating mainshaft in connection with multiple countershafts, have proven to be highly acceptable. However, to achieve a sufficiently large range of available gear ratios, it has generally been necessary to utilize a compound transmission. Such transmissions generally comprise a main transmission and an auxiliary transmission of either the "range" type or the "splitter" type or a combination thereof as is well known in the prior art. Such transmissions are highly effective and commercially successful, especially for use in heavy duty vehicles wherein a large range of ratios is required and a large number of individual gear ratios is required. Such heavy duty compound transmissions typically have 9, 10, 12, 13 or more forward gear ratios.

There has, however, developed a need for transmissions having a greater range of ratios and a greater number of ratios than is normally available in a simple transmission as the center-line distances required in prior art simple transmissions to provide same would become too great yet not justifying the somewhat expensive structure and controls required for a compound transmission. The prior art devices have been unable to completely satisfactorily fill this need.

SUMMARY OF THE INVENTION

In accordance with the present invention, a simple transmission which minimizes center distances, i.e., the distance between the mainshaft and the countershaft axis, minimizes the axial length of the countershaft portions and/or provides a greater range and/or number of available gear ratios than has heretofor been available is provided. The transmission preferably utilizes a floating mainshaft in connection with substantially identical multiple countershafts, each of said countershafts being compounded to provide an extended range of ratios with a minimal center distance and minimum axial length of countershaft portion. The countershafts are compounded by the use of a countershaft idler which may be mounted on an axis parallel to the axes of the countershaft and/or may be on an axis concentric with the axis of the mainshaft.

Accordingly, it is an object of the present invention to provide a simple transmission having an extended range and number of available gear ratios with a minimal centerline distance and/or axial length of countershaft portions.

Another object of the present invention is to provide a simple transmission utilizing at least one compound countershaft.

A further object of the present invention is to provide a floating mainshaft, multiple countershaft transmission wherein each of the countershafts is compounded to provide an extended range and/or number of available gear ratios within a predetermined centerline.

These and other objects and advantages of the present invention will become apparent from a reading of the detailed description of the preferred embodiment taken in connection with the attached drawings.

DESCRIPTION OF THE DRAWINGS

FIG. 3 is a schematic representation of a further embodiment of the present invention.

FIG. 4 is a sectional view of the transmission schematically illustrated in FIG. 3.

FIG. 5 is a schematic illustration of the shift pattern for the transmission illustrated in FIGS. 1 to 3.

DETAILED DESCRIPTION OF THE PREFERRED EMBODIMENT

Figure 1:
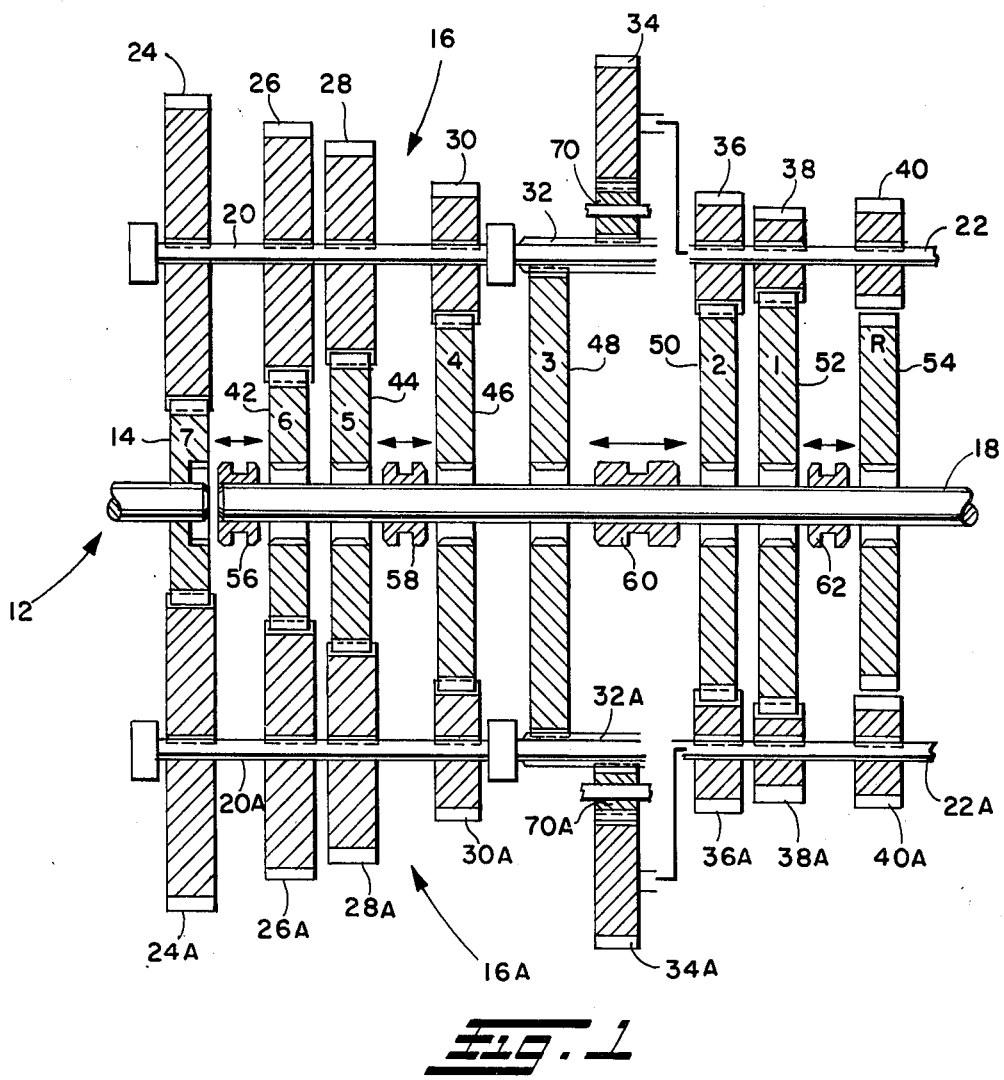
FIG. 1 is a schematic illustration of one embodiment of the present invention.

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. All foregoing terms mentioned include the normal derivatives and equivalent of each thereof.

For convenience of identification, the shafts 12, 112 and 212 have throughout been called the input shaft, and the shafts 18, 118 and 218 have been called the main shaft and output. This terminology has, however, been used for convenience in reference and is to be given no limiting significance inasmuch as the apparatus will operate with the direction of power flow reversed.

One embodiment of the transmission of the present invention may be seen by reference to FIG. 1. The transmission 10 schematically illustrated is of the multiple countershaft type, it being understood, however, that single countershaft transmissions may utilize the features of the present invention. The transmission 10 comprises an input shaft 12 designed to be driven by the prime mover of the vehicle and carrying a drive gear 14 thereon. A pair of compound countershafts 16 and 16A and a floating mainshaft 18 are provided. The axes of the mainshaft 18 and the compound countershafts, 16 and 16A, are substantially parallel. The axis of input shaft 12 is substantially concentric with the axis of mainshaft 18. The compound countershafts, 16 and 16A, are substantially identical. Each of the compound countershafts, 16 and 16A, comprises a forward portion 20 and 20A and a rearward portion 22 and 22A, respectively. Forward countershaft portions, 20 and 20A, are separately rotatable and are substantially coaxial with the rearward portions 22 and 22A respectively. The forward portions 20 and 20A of the compound countershafts, 16 and 16A, carry gears 24, 26, 28, 30, 32 and 24A, 26A, 28A, 30A and 32A, respectively. The rearward portions, 22 and 22A, of the compound countershafts, 16 and 16A, carry gears 34, 36, 38, 40 and 34A, 36A, 38A, 40A, respectively. Gears 42, 44, 46, 48, 50, 52 and 54 encircle the mainshaft 18 and are constantly engaged with and supported by the countershaft gears 26, 26A, 28, 28A, 30, 30A, 32, 32A, 36, 36A, 38, 38A, 40, 40A, respectively, as is well known in the art. Axially slidable clutches 56, 58, 60 and 62 are splined to the mainshaft for rotation therewith in a known manner. Clutch 56 may be selectively engaged to rotationally fix either the input shaft 12 or the gear 42 to the mainshaft. Clutch 58 may be selectively engaged to fix gear 44 or gear 46 to the mainshaft. Clutch 60 may be selectively engaged to fix gear 48 or gear 50 to the mainshaft. Clutch 62 may be utilized to fix gear 52 or gear 54 to the mainshaft.

The operation and structural features of the "floating" mainshaft, multiple countershaft type of transmission described above is well known in the prior art and a more detailed description thereof may be seen by reference to U.S. Pat. Nos. 3,105,395; 3,237,472; 3,335,616; and/or 3,500,695, all of which are assigned to the assignee of this invention and all of which are hereby incorporated by reference.

In operation, the input shaft 12 drives a gear 14 which is constantly engaged with gears 24 and 24A to drive the compound countershafts 16 and 16A and the countershaft gears mounted thereon. The countershaft gears are constantly engaged with the mainshaft gears and thus mainshaft gears 42, 44, 46, 48, 50, 52 and 54 are constantly rotating whenever the input shaft is rotating. The operator of the vehicle may, for example, simply move sliding clutch 62 to the right to rotationally couple gear 54 to the mainshaft to achieve a reverse rotation. Similarly, sliding clutch 62 may be moved to the left to couple gear 52 to the mainshaft 18 for operation in the first forward speed. Similarly, sliding clutch 60 may be utilized to engage gear 50 with the mainshaft for second speed or gear 48 with the mainshaft for third speed. In a similar manner clutch 58 may be utilized to engage gear 46 with the mainshaft for fourth speed or gear 44 with the mainshaft for fifth speed. Clutch 56 may be utilized to engage gear 42 with the mainshaft for sixth speed or to engage the input shaft 12 directly with the mainshaft 18 for seventh speed operation.

Reference to FIG. 5 will illustrate the shift pattern followed by the operator.

Idler gears 70 and 70A are in constant engagement with gears 32 and 32A on the forward countershaft portion 20 and 20A and are in constant engagement with gears 34 and 34A on the rearward countershaft portion 22 and 22A. Thus, the forward countershaft portions, 20 and 20A, drive the rearward countershaft portions, 22 and 22A, through the idler gears 70 and 70A and a further gear reduction may thus be achieved without the requirement of increasing the center distance of the transmission. It is noted that the term "center distance" as used in connection with multiple countershaft transmissions means the distance between the axis of rotation of either of the countershafts and the axis of rotation of the mainshaft. Idler gears 70 and 70A are mounted on an axis parallel to the axes of the countershafts.

Figure 2:
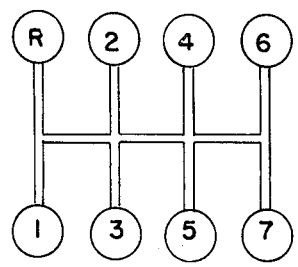
FIG. 2 is a schematic representation of another embodiment of the present invention.
Figure 2:
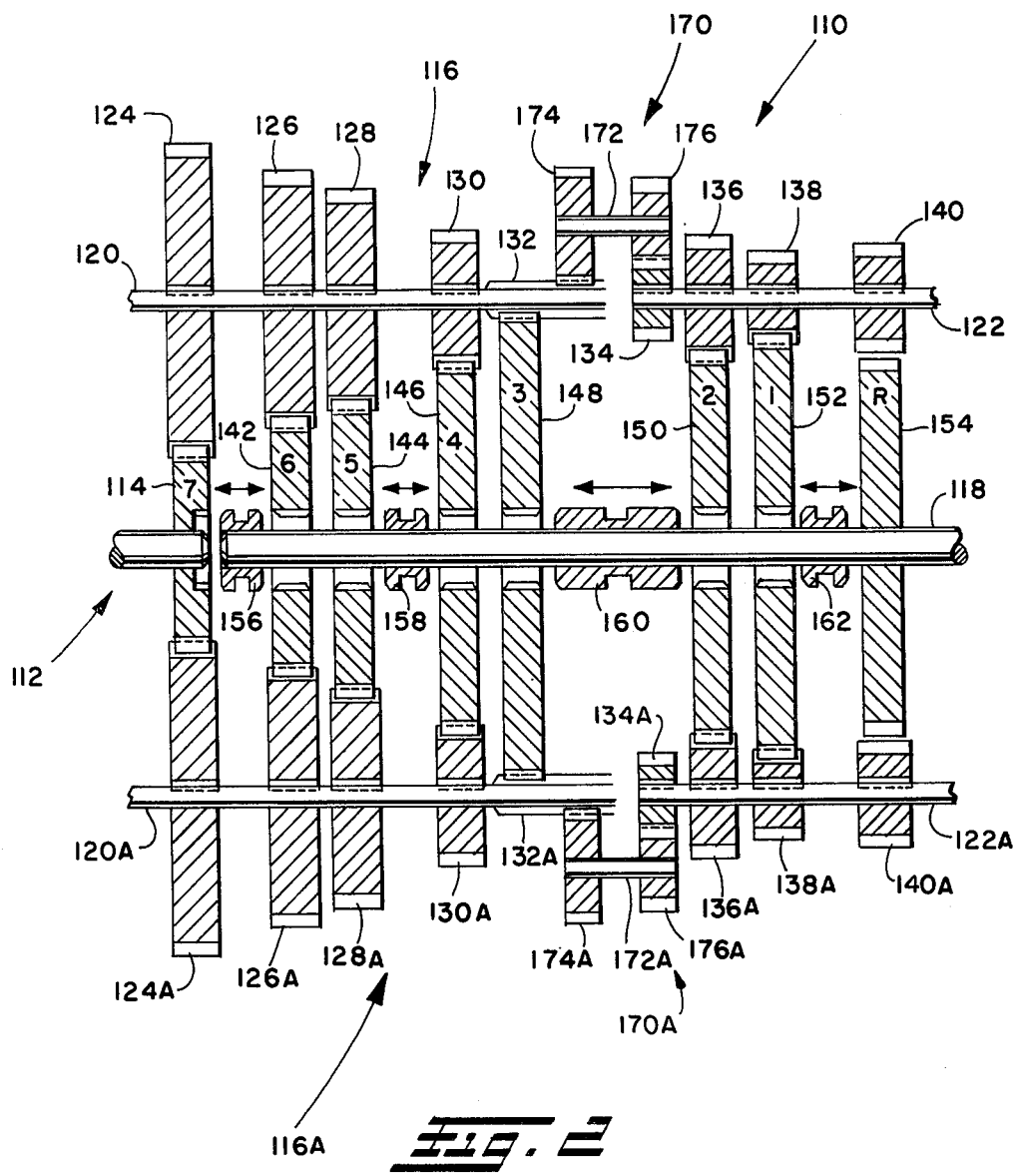

An alternate embodiment of the present invention may be seen by reference to FIG. 2. In the description of this embodiment, transmission 110, elements like elements of transmission 10 will be assigned like reference numerals with a "1" appended thereto. The transmission 110 is substantially identical to the transmission 10 described above in that an input shaft 112 carrying a drive gear 114 is utilized to drive a pair of substantially identical compound countershafts 116 and 116A by means of countershaft gears 124 and 124A mounted on the compound countershafts 116 and 116A, respectively. The compound countershafts 116 and 116A each comprise a forward portion, 120 and 120A, and a rearward portion, 122 and 122A, respectively. Gears 124, 126, 128, 130, 132, 134, 136, 138 and 140 on compound countershaft 116 and their counterparts on compound countershaft 116A all serve the same function as that described for transmission 10 and will not be described in further detail. The transmission includes a floating mainshaft 118 surrounded by gears 142, 144, 146, 148, 150, 152, and 154 which operate in the same manner as the corresponding gears of transmission 10 described above and will not be described in further detail. Similarly, clutches 156, 158, 160 and 162 are structurally and operationally similar to those described above in connection to transmission 10 and will not be described in any further detail.

The major difference between transmission 110 and transmission 10 described above involves the structure and operation of the idler gearing between the forward countershaft portions, 120 and 120A, and the rearward countershaft portions, 122 and 122A. In this embodiment, compound idlers 170 and 170A are utilized. The idlers, 170 and 170A, are compound and comprise an idler shaft, 172 and 172A, respectively, upon the forward end of which is mounted gear, 174 and 174A, respectively, which are in meshing engagement with gears 132 and 132A, respectively. The rearward end of the idler shafts 172 and 172A carry gears 176 and 176A, respectively, which are in meshing engagement with gears, 134 and 134A, respectively, to drive the rearward countershaft portions 122 and 122A, respectively. The idler shafts 172 and 172A are parallel to the axes of rotation of the countershafts and the mainshaft. The use of such compound idlers allows for a greater reduction in speed between the forward portions, 120 and 120A, and the rearward portions, 122 and 122A, of the countershafts, 116 and 116A, respectively, to achieve a greater range of available gear ratios without increasing the centerline distances.

Another embodiment of the present invention may be seen by reference to FIG. 3. In this embodiment, elements similar in function and structure to those described in the embodiment described in FIG. 1 will be designated by like numerals with a "2" appended thereto. The transmission 210 is provided with an input shaft 212 carrying a drive gear 214 which is in constant engagement with gears 224 and 224A carried by the twin compound countershafts 216 and 216A. The compound countershafts 216 and 216A comprise forward portions, 220 and 220A, respectively, and rearward portions, 222 and 222A, respectively. Gears 224, 226, 228, 230, 232, 234, 236, 238, and 240 carried by compound countershaft 216 and the corresponding gears on compound countershaft 216A are similar in structure and function to the corresponding gears discussed above in connection with transmission 10 and will not be described in any further detail. Similarly, gears 242, 244, 246, 248, 250, 252, and 254 and clutches 256, 258, 260 and 262 associated with the mainshaft 218 are substantially identical in structure and function with the corresponding gears and clutches discussed in connection with transmission 10 and will not be described in further detail herein. Countershaft gears 232 and 232A meshingly engage and drive mainshaft gear 248 as may be seen. An idler gear 270 also surrounds mainshaft 218 and is splined or coupled to gear 248 for rotation therewith. The idler gear 270 drivingly engages countershaft gears 234 and 234A which are rotationally fixed to rearward countershaft portions 222 and 222A, respectively, to drive the rearward portions 222 and 222A of the countershafts. In this embodiment, idler gear 270 has an axis of rotation concentric with the axis of rotation of the mainshaft 218.

FIG. 4 illustrates the structural embodiment of the transmission 210 schematically illustrated in FIG. 3. Elements of the transmission structure illustrated in FIG. 4 corresponding to those elements schematically illustrated in FIG. 3 will be assigned like numerals.

The multicountershaft transmission 210 includes a horizontally split housing H, only a portion of which is shown. The housing H has a forward end wall 302 and a rearward end wall 303. Each of said endwalls is provided with openings for receipt of the various shaft bearings. The input shaft 212 is supported by bearing 304 and carries an enlarged splined head 306 on the rearward end thereof. The head 306 carries splines 307 which support the annular drive gear 214. The drive gear 214 has external teeth 308 and internal clutch teeth 310.

The transmission 210 includes two substantially identical or twin compound countershafts 216 and 216A, only one of which, 216, is illustrated. Countershaft 216 comprises a forward portion 220 and a rearward portion 222. Forward portion 220 of compound countershaft 216 is supported by bearings 312 and 314. Rearward portion 222 of countershaft 226 is supported by bearings 316 and 318. The forward portion 220 of countershaft 216 carries thereon and fixed for rotation therewith countershaft gears 224, 226, 228, 230, and 232. The rearward portion 222 of countershaft 216 carries thereon and fixed for rotation therewith countershaft gears 234, 236, 238, and 240. Countershaft gear 224 is in constant mesh with the input or drive gear 214.

The main shaft 218 also comprises the output unit of transmission 210. The mainshaft is arranged substantially coaxially with the input shaft 212 and is mounted for a degree of radial movement or floating movement relative to the countershafts 216 and 216A. In the embodiment illustrated, the forward end 320 of the mainshaft 218 is loosely received with a bushing 322 located in an annular recess at the rearward end of input shaft 212. The rearward end 324 of mainshaft 218 is pivotally supported by a bearing 326. Further details as to the mounting of the mainshaft may be seen by reference to U.S. Pat. No. 3,500,695. This type of a floating mounting of the mainshaft is for descriptive purposes only and is not intended to be limiting. Mainshaft gears 242, 244, 246, 248, 250, 252 and 254 encircle the mainshaft 218 for constant engagement with and support by the countershaft gears as is well known in the prior art. Clutch units 256, 258, 260 and 262 are utilized to selectively clutch one of the mainshaft gears to the mainshaft.

By way of example, mainshaft clutch unit 256 is slidingly mounted on the forward end of the mainshaft 218 on splines 328 and carries clutch teeth 330 which are engageable with the clutch teeth 310 on the input drive gear 214 upon leftward movement of said clutch unit 256. Clutch unit 256 also carries clutch teeth 332 which are engageable with suitable internal clutch teeth 334 in the mainshaft gear 242 upon rightward movement of the clutch unit 256. The remainder of the mainshaft clutch units, 258, 260, and 262, operate in a similar manner and will not be described in further detail. Shift forks 336, 338, 340 and 342 are utilized to selectively move mainshaft clutch units 256, 258, 260 and 262, respectively, either to the right or to the left as is well known in the art.

Each of the gears 242, 244, 246, 248, 250, 252, and 254 may be collectively termed "mainshaft gears" since they are all capable of drivingly engaging the mainshaft. However, it is emphasized that they are all supported on and by the countershaft gears and that they merely surround and at times engage the mainshaft but are not supported on or by the mainshaft. Rather, the mainshaft will move both rotatably and about the pivot axis with respect to those of the mainshaft gears with which it is not clutched at a particular moment.

Synchronizers and/or blocking rings can, if desired, be provided between the interengageable teeth associated with the various clutch units and the internal clutch teeth associated with the various mainshaft gears.

Surrounding the mainshaft but not supported thereby is an idler gear 270. Idler gear 270 is rotationally coupled to mainshaft gear 248, as by means of axially extending sleeve 344 for rotation therewith. It is noted that idler gear 270 is fixed for rotation with mainshaft gear 248, idler gear 270 is driven by countershaft gear 232 on the forward countershaft portion 220 of countershaft 216. Idler gear 270 is in constant engagement with countershaft gear 234 on rearward countershaft portion 222 of countershaft 216 and thus a substantial gear reduction between the forward countershaft portion 220 and the rearward countershaft portion 222 of countershaft 216 is achieved without the necessity of increasing the center distance 350 which is the distance between the centerline of the countershaft 216 and the mainshaft 218.

It is noted that countershaft gear 240 and mainshaft gear 254 are not in direct meshing engagement but rather each mesh with a reverse idler (not shown) as is well known in the art.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:
1. A change gear transmission comprising:
an input shaft having an input gear supported thereon for rotation therewith;
a mainshaft generally coaxial with said input shaft;
at least one compound countershaft having an axis of rotation substantially parallel to the axis of rotation of said mainshaft, said countershaft having a plurality of countershaft gears supported thereby for rotation therewith, one of said countershaft gears in constant meshing engagement with said input gear to establish a driving relation between said input shaft and said countershaft;
a plurality of mainshaft gears surrounding said mainshaft for free rotation relative thereto, each of said mainshaft gears being constantly meshed with one of said countershaft gears; and means to selectively clutch said mainshaft gears one at a time to said mainshaft to establish a driving relation between said countershaft and said mainshaft;

said compound countershaft comprising a first portion carrying said countershaft gear constantly meshed with said input gear and a second portion, a countershaft gear on said first portion and a countershaft gear on said second portion each being constantly meshed with an idler to establish a driving relation between said first and second countershaft portions.

2. The change gear transmission of claim 1 wherein rotation of said input shaft will cause said first portion of said compound countershaft to have a greater angular velocity than said second portion of said compound countershaft.

3. The change gear transmission of claim 2 wherein at least two substantially identical compound countershafts are provided, each of said countershafts carrying a like plurality of countershaft gears for rotation therewith, one substantially identical countershaft gear on each of said countershafts being in constant meshing engagement with each mainshaft gear, said mainshaft gear supported on the countershaft gears in meshing engagement therewith.

4. The transmission of claim 3 wherein the axis of rotation of said idler is coaxial with the axis of rotation of said input shaft.

5. The transmission of claim 4 wherein said mainshaft comprises the output unit of said transmission.

6. The transmission of claim 3 wherein therefor idler is provided for each countershaft, each of said idlers comprising an idler shaft having an axis of rotation substantially parallel to the axes of rotation of said countershaft, each of said idler shafts carrying a first idler gear thereon in constant meshing engagement with a gear on said first countershaft portions and a second idler gear in constant meshing engagement with a countershaft gear on said second countershaft portions.

7. The transmission of claim 6 wherein said first idler gears are of a larger diameter than said second idler gears.

8. The transmission of claim 3 wherein said idler surrounds said mainshaft and is fixed to one of said mainshaft gears in constant mesh with a countershaft gear carried by the first countershaft portions of said countershaft.

9. The transmission of claim 3 wherein one of said mainshaft gears is in constant meshing engagement with and is supported by a plurality of reverse idler gears which are in turn in constant meshing engagement with countershaft gears carried by said second countershaft portions.

10. The change gear transmission of claim 3 wherein said mainshaft gears are radially movable relative to the axis of rotation of said mainshaft and said first and second countershaft portions of each countershaft are substantially coaxial.

11. An improved simple change gear transmission of the type comprising an input shaft having an input gear thereon, a mainshaft, at least one countershaft driven by said input gear, said countershaft having an axis of rotation substantially parallel to axis of rotation of said mainshaft, a plurality of countershaft gears supported by said countershaft for rotation therewith, a plurality of mainshaft gears surrounding the mainshaft, each of said mainshaft gears in constant engagement with a countershaft gear and clutch means for selectively clutching said mainshaft gears one at a time to said mainshaft, the improvement comprising:

said countershaft having a first portion carrying a countershaft gear in engagement with said input gear and a second portion, a countershaft gear on said first portion and a countershaft gear on said second portion in constant engagement with an idler means to establish a driving relation between said first and second portions, said first portion having greater angular velocity than said second portion.

12. The improved transmission of claim 11 wherein said idler means comprises an idler shaft having a first and second idler gear supported thereon for rotation therewith, said first idler gear in constant engagement with a countershaft gear on said first countershaft portion and said second idler gear in constant engagement with a countershaft gear on said second countershaft portion.

13. The improved transmission of claim 11 wherein said first and second countershaft portions are substantially coaxial.

14. The improved transmission of claim 13 wherein said idler means comprises an idler gear surrounding said mainshaft and rotationally coupled to a mainshaft gear in constant engagement with a countershaft gear on said first countershaft portion, said idler gear in constant engagement with a countershaft gear on said second countershaft portion.

15. The improved transmission of claim 14 wherein said transmission comprises at least two substantially identical countershafts and said mainshaft gears are supported by the countershaft gears in meshing engagement therewith.

* * * * *

UNITED STATES PATENT AND TRADEMARK OFFICE
CERTIFICATE OF CORRECTION

PATENT NO. : 4,152,949
DATED : May 8, 1979
INVENTOR(S) : John R. Vandervoort; Alan R. Davis It is certified that error appears in the above-identified patent and that said Letters Patent are hereby corrected as shown below:

This patent was assigned to Eaton Corporation.

Please indicate Attorney, Agent, or Firm: R.J.McCloskey; Howard D. Gordon.

Col. 7, line 34, Claim 6: Delete "therefor" and insert ---a separate---.

Signed and Sealed this

Eighteenth Day of September 1979

[SEAL]

Attest:

LUTRELLE F. PARKER
*Attesting Officer*   *Acting Commissioner of Patents and Trademarks*